Feb. 26, 1935. P. S. JENKINS 1,992,574
RIGID SUSPENSION SYSTEM AND METHOD FOR ELECTRIC WIRING
Filed April 5, 1928  2 Sheets-Sheet 1
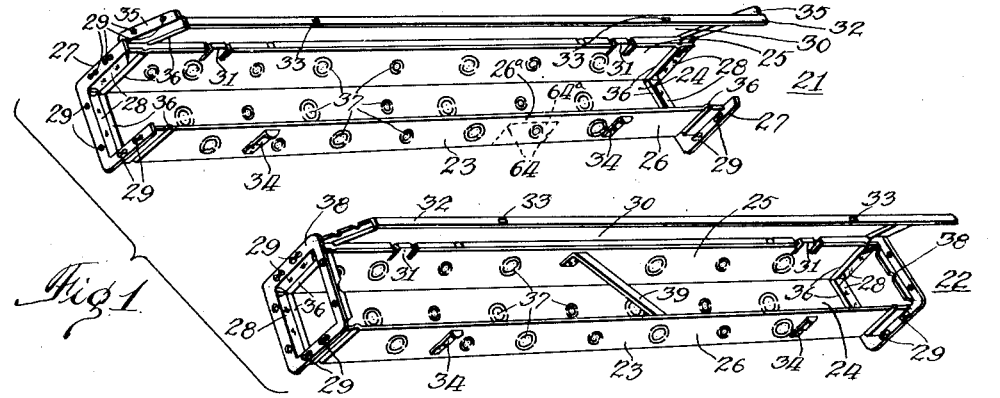
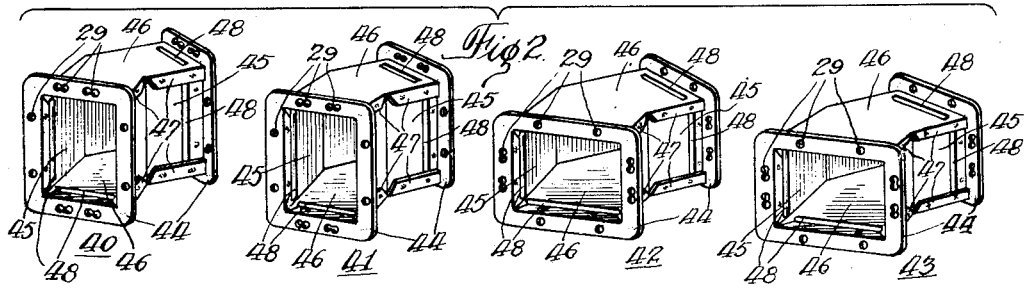
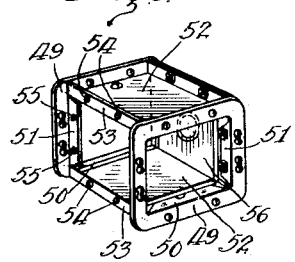
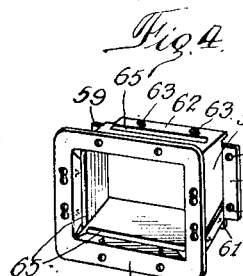
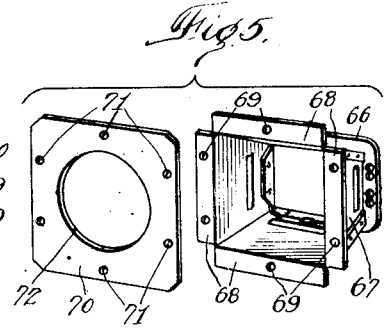
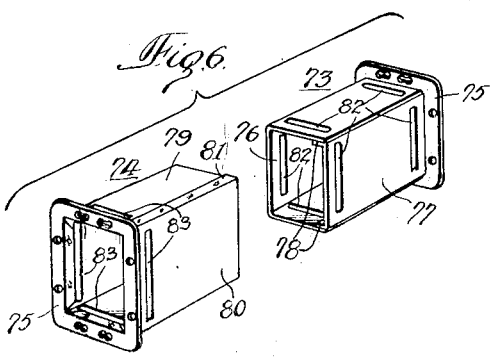
Inventor
Paul S. Jenkins
By Jones, Addington, Ames & Seibold
Attys Feb. 26, 1935.　　　　P. S. JENKINS　　　　1,992,574
RIGID SUSPENSION SYSTEM AND METHOD FOR ELECTRIC WIRING
Filed April 5, 1928　　　2 Sheets-Sheet 2
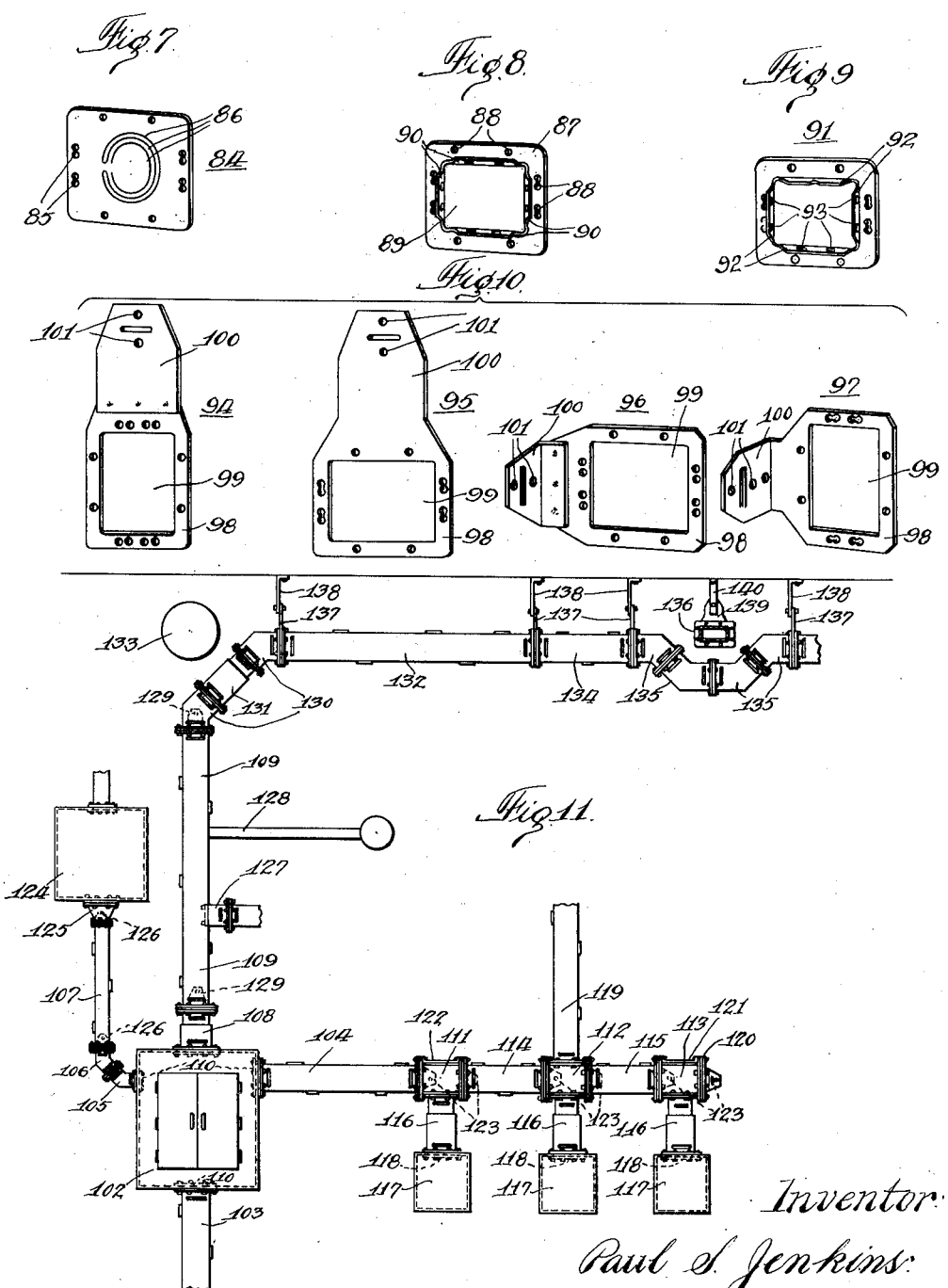

Patented Feb. 26, 1935

1,992,574

UNITED STATES PATENT OFFICE

1,992,574

RIGID SUSPENSION SYSTEM AND METHOD FOR ELECTRIC WIRING

Paul S. Jenkins, Detroit, Mich., assignor to Square D Company, Detroit, Mich., a corporation of Michigan Application April 5, 1928, Serial No. 267,592

27 Claims. (Cl. 247—3)

This invention relates to a rigid suspension system and method for electric wiring and has particular relation to new and improved conduit or duct members and suitable fittings therefor which are adapted for use in such systems, as well as to methods of arranging said members.

One of the most common methods of installing electric wires, particularly in factories and business buildings, at the present time, involves the use of wrought iron pipe conduit with standard pipe fittings therefor. It is the universal practice to utilize standard wrought iron pipe and fittings for such installations for the reason that the manufacture of special pipe and fittings for this purpose would involve considerable additional expense. The thickness and weight of this type of conduit are very considerable, especially in the larger sizes, and are considerably in excess of that actually required for the service. Furthermore, wires can be installed in pipe conduit only by pulling the same through the pipe. When the wires have been installed in this manner, there is no possibility of access thereto without disassembling the conduit system and pulling the wires out of the same.

It is an object of the present invention to provide a conduit system, the parts of which shall be much lighter and easier to handle than those formerly in use, and that shall provide for ready access to the wires within the conduit system without disassembling the conduit system itself.

It is also contemplated that this invention will reduce the cost of installation of conduit systems, both as to the material required and as to the labor involved in erecting and maintaining the system.

The invention also provides for complete adaptability to service in which it is necessary that the new and improved devices may be connected with pipe conduit systems such as those now in common use, and also for connection with all types of electric devices, such as panel boards, switch boxes and the like.

It is to be noted further that the conduit members and fittings embodying the present invention are capable of accommodating larger numbers of wires than are any of the other systems now in use and that additional wires may be added to those already installed in a system without the necessity of disassembling the system, using any wrenches or other tools, or involving any appreciable amount of labor.

The invention contemplates, in general, the provision of sheet metal conduit sections and fittings forming duct passages of substantially rectangular cross-section. All of the conduit members and fittings are provided with flanges at the ends thereof whereby the various sections may be readily secured together when the same are installed in a conduit system.

It will be understood that all of the parts are interchangeable, whereby any desired condition may be obtained in installing a wiring system. The various fittings utilized include, in addition to straight conduit sections, elbow sections of various angular bends, junction boxes, T fittings, box fittings, telescope fittings, and various forms of hangers and other accessories.

The invention will be better understood by reference to the following detailed description, together with the accompanying drawings, in which:

Figure 1 is a perspective view of two types of straight conduit sections constructed according to the invention;

Fig. 2 is a perspective view of different forms of elbow fittings adapted for use in systems of the character referred to;

Fig. 3 is a perspective view of a junction box fitting;

Fig. 4 is a perspective view of a T fitting;

Fig. 5 is a perspective view of a box fitting and a washer member utilized therewith;

Fig. 6 is a perspective view of a telescope fitting;

Fig. 7 is a perspective view of a closure plate;

Fig. 8 is a perspective view of a panel fitting collar;

Fig. 9 is a perspective view of a trough collar;

Fig. 10 is a perspective view of different types of hangers; and

Fig. 11 is a front elevational view of a portion of a conduit system utilizing the various parts and fittings shown in the preceding figures.

Reference will now be had to the figures of the drawings in numerical order.

Figure 1 shows two straight conduit sections 21 and 22 differing slightly in details of construction. The conduit section 21 comprises a trough portion 23 formed of a single piece of sheet metal bent to form a bottom wall 24, a rear wall 25 and a front wall 26. Flange members 27 are secured to the respective ends of the trough portion 23 by spot-welding or in any other suitable manner, the securing action being effected between inwardly bent lip portions 28 of the flange members 27 and the extremities of the trough portion 23.

The main portion of each of the flange members 27 lies in a plane substantially perpendicular to the longitudinal axis of the trough portion 23 and extends outwardly from said trough portion on three sides corresponding to the bottom, rear and front walls of the trough portion. These outwardly extending portions of the flange members 27 are provided with holes 29 for the reception of screws or other suitable means for securing adjacent sections together when the same are embodied in a conduit system, as will be hereinafter described.

A cover member 30 is secured to the rear wall of the trough portion 23 by hinges 31 which may be made by cutting and bending portions of the metal of said wall to cooperate with suitable apertures in the cover member, according to well-known practice in the switch box art.

The forward edge of the cover member 30 is bent downwardly to form an overlapping flange portion 32 having apertures or depressions 33 therein to cooperate with latch members 34 that are secured to the outer surface of the front wall 26 of the trough portion 23. The latch members 34 are of resilient material and comprise suitable lugs or projections for engaging the apertures or depressions 33 to maintain the cover member 32 in closed relation to the trough portion 23.

It will be apparent that these latch members may be manually released when it is desired to open the cover member to gain access to the interior of the trough portion 23.

The ends of the cover member 32 are bent upwardly to form upstanding flange portions 35, which, when the cover member is closed, lie in such relation to the flange members 27 as to complete a peripheral flange at each end of the conduit section. The upturned ends 35 also have holes 29 therein for the reception of screws or other securing means.

It is also contemplated that the ends of each wall of the trough portion 23 may be bent outwardly to form integral end flange portions similar to the flange portions 35 of the cover member, thus eliminating the separate flange members 27, if desired.

Each wall of the trough portion 23, as well as the cover member 32, is formed with an inwardly projecting rib 36 near each end thereof. These ribs present relatively smooth surfaces that contact with wires which are placed within the conduit section and serve to protect such wires from contact with the edges of the lip portions 28 of the flange members 27. This construction is of considerable advantage, inasmuch as the said lip portions are apt to have relatively sharp edges which might damage the insulation of wires within the conduit section, if such wires were allowed to contact therewith.

The trough portion 23 is provided with knock-out portions 37 throughout the length of each of the wall portions thereof. These knock-out portions are provided by making series of nearly complete arcuate incisions in the metal of the walls whereby disc-shaped pieces may be readily knocked out of the walls to provide apertures for the reception of pipe conduit sections wherever desired.

These arcuate incisions may be of various sizes disposed in concentric arrangement, whereby apertures for the reception of different sizes of pipe conduits may be provided at any desired position along the length of the trough portion. The provision of these knock-out portions permits ready connection between a conduit system using the sheet metal members of the present invention and pipe conduits which are in common use at the present time.

The conduit section 22, also shown in Fig. 1, differs essentially from the conduit section 21 only in that a different type of end flanges is utilized. The end flanges 38, shown in conjunction with this form of conduit sections, are of substantially rectangular contour with rectangular apertures therein corresponding in size to that of the duct passage through the trough portion 23.

The flanges 27 used with the conduit section 21 extend around the three sides of the trough portion 23 only and the fourth side of the flange is made either as an integral portion of the cover member 32 or made as a separate portion rigidly secured to the cover member. The closed flange members 38 lend some additional strength and rigidity to the structure of the trough portion, but prevent wires from being laid in the conduit section without the necessity of drawing such wires through the openings in the flange members.

The conduit section 22 is also shown as being provided with a brace member 39 in the form of a relatively rigid strap secured at its respective ends to the rear and front walls 25 and 26 of the trough portion 23. This brace member is omitted in the conduit section 21 in order that the full advantages of the open flange construction may be obtained, that is, to permit the wires to be laid in the trough portion rather than necessitating their being drawn longitudinally therethrough.

The two slightly different forms 21 and 22 of straight conduit sections are disclosed herein as illustrative of some of the modifications which may be made in the structure without departing from the contemplated embodiment of the invention.

It will be readily appreciated that the straight conduit sections 21 and 22 may be made in any desired lengths, and that commercial usage will determine the particular lengths in which these sections will be made as standard units.

It will also be observed that the various conduit sections and fittings are shown herein as being formed with duct passages slightly greater in one dimension than in the other. This detail of construction is determined simply by the relative convenience of manufacture and installation, and it is not intended that the present invention be limited to the particular arrangement shown in this respect. It is obvious that the conduit sections and fittings might be made with square duct passages or rectangular passages of different proportions, if desired.

Fig. 2 shows four elbow fittings 40, 41, 42 and 43 that are adapted to be utilized with the conduit sections and other fittings embodying my invention. The elbow fittings 40 and 41 are provided for effecting changes of 45° and 22½°, respectively, in the direction in which the duct passage extends in a plane parallel to the narrower sides of said duct sections. The elbow fittings 42 and 43 are provided for effecting similar angular changes in a plane parallel to the wider sides of the conduit sections.

Each of the several elbow fittings comprises end flange members 44 that are identical with the end flange members 38 of the conduit section 22, shown in Fig. 1. These flange members are provided with holes 29, corresponding in the location to those in the end flanges of the conduit sections and other fittings, whereby the various conduit sections and fittings may be interchangeably secured together.

The main portions of the elbow fittings are made with side walls 45 bent at the proper angle substantially at the middle thereof, and secured at their respective ends to the inwardly projecting lip portions of the end flanges 44. The top and bottom walls 46 are formed with flange portions 47 overlapping the side walls 45 and secured thereto by spot-welding, or in any other suitable manner. Inwardly pressed ribs 48 are provided in the same manner and for the same purpose as the ribs 36 in the straight conduit sections.

The junction box section shown in Fig. 3 consists of two end flange members 49, corresponding to the flange members of the straight conduit sections and other fittings. These end flange members are provided with inwardly bent lip portions 50 along the wider sides of the duct passage and similar lip portions 51 along the narrower sides of the duct passage.

Two side plates 52 are secured at their respective ends to the lip portions 50 to complete the structure of this particular fitting. The edges of the side plates 52 are bent outwardly to form flange portions 53 lying in co-planar relation to the lip portions 51 and provided with holes 54 located to correspond with the holes in the flange portions of the other fittings and conduit sections. The lip portions 51 are similarly provided with holes 55.

It will be noted in this connection that the holes in the narrower edges of the end flange members of the various fittings are of attenuated form and centrally contracted, whereby the screws or other securing means to be passed therethrough may be placed in either of two positions. The holes 55 in the lip portions 51 are spaced a distance corresponding to the spacing of the outer portions of the holes in the end flanges, whereby screws may be placed therein without interfering with those in the end flanges.

It will be seen that the junction box fitting is capable of receiving and being secured to other fittings or conduit sections on all sides thereof except one of the two sides on which the side plates 52 are secured. One of the side plates 52 is preferably secured to the end flange members 49 by spot-welding or other permanent securing means to form a rigid structure including the two end flange members. This fitting is, therefore, suitable for use as a right-angle elbow fitting, a T fitting or a cross-fitting, as desired, and is also adapted to receive, in place of the removable side plate 52, a connection for a conduit line extending perpendicularly to the plane in which the other connected conduit lines lie.

If any one or more of the four sides of the fitting are not connected to other fittings or conduit sections, such side or sides may be closed up by means of a closure plate 56, as shown in Fig. 3. Such a closure plate is shown in detail in a subsequent figure of the drawings and will be described in connection therewith.

The T fitting shown in Fig. 4 is provided for making a connection to a straight conduit section at a point intermediate the ends thereof, that is, at some point other than that of a junction between two conduit sections or other fittings.

This fitting comprises a relatively short body portion 57, to one end of which an end flange 58, of design similar to that of the end flanges provided for the other fittings, is secured. The body portion 57 may be made of two or more pieces of sheet metal spot-welded together, as in the case of the other fittings.

At the end opposite the flanges 58, two side flange portions 59 project outwardly from the side walls of the body portions 57 and are provided with holes 60 for the reception of securing means. Another flange portion 61 projects downwardly from the lower wall of the body portion 57, as viewed in Fig. 4. This flange portion is relatively short in projection from the body portion of the fitting and ordinarily is not provided with any holes for the reception of securing means.

A tongue portion 62 is formed as an integral extension of the upper wall of the body portion 57, as viewed in Fig. 4, and lies in substantially the same plane as said upper wall. The tongue portion 62 has holes 63 therein, for the reception of the usual screws or other securing means. These holes may be provided either when the fitting is manufactured or may be drilled when the same is installed, this being the case also with respect to the holes 60 in the side flange portions 59.

The body portion 57 of the T fitting is preferably tapered in respect to its narrower dimension from the end at which the flange member 58 is secured toward the other end of the body portion. This taper is of such magnitude that the distance from the lower edge of the bottom flange portion 61 to the tongue portion 62 is substantially equal to the narrower dimension of the conduit sections.

The dotted lines 64 and 64a in Fig. 1 indicate the manner in which such a wall is cut before applying a T fitting, such as that shown in Fig. 4, thereto. A rectangular portion extending from the bottom edge of the wall 26 to the line 64a, is removed, leaving a bridging portion 26a to prevent undue weakening of the trough section and to facilitate attaching the T fitting thereto. The width of the portion that is removed from the wall 26, that is, the distance between the dotted lines 64, is equal to the width of the duct opening in the T fitting, which is the same as the wider dimension of the duct openings in the conduit sections and other fittings.

The T fitting is applied to the conduit section, after the indicated portion has been removed, with the short projecting flange portion 61 underlying, or hooked under, the bridging portion 26a and with the tongue portion 62 overlying the edge of the bottom wall 24 of the conduit section on the exterior surface thereof. The flange portions 59 then overlie the edges of the aperture in the front wall 26, indicated by the dotted lines 64. The flange portion 61 lies in a slightly projected plane with respect to the plane of the flange portions 59 to permit the latter portions to lie snugly against the wall 26, when the flange portion 61 is hooked under the bridging portion 26a, as described.

Holes may then be drilled in the front wall 26 of the conduit section corresponding to the holes 60 in the side flange portions 59 of the T fitting, and holes corresponding to the holes 63 in the tongue portion 62 of said fitting are drilled in the bottom wall 24 of the conduit section. Suitable screws or other securing means may then be inserted to secure the T fitting firmly to the side of the conduit section 21.

It will be observed that inwardly extending rib portions 65 are provided in the walls of the body portion 57 of the T fitting. These ribs are provided for the same purpose and in the same manner as the ribs 36 of the straight conduit sections and the ribs 48 of the elbow sections.

The box fitting shown in Fig. 5 is utilized where it is desired to make a connection between a conduit system constructed according to the present invention and a switch box, panel board, or other device, especially where such device is provided with a round hole through which wires are brought into the same.

This fitting comprises an end flange member 66 identical with the end flanges of the other devices, and a body portion 67 constructed of two or more pieces of sheet metal suitably secured together, as by spot-welding. The body portion 67 flares outwardly from the narrower dimension thereof at the end to which the flange member 66 is secured, to such extent that the opposite end thereof is substantially square. The four walls of the body portion 67, at the substantially square end, are bent outwardly to form flange portions 68 having holes 69 therein.

A washer member 70 of fiber or other suitable material is provided for insertion between the square end of the body portion 67 of the box fitting and the switch box or other device to which the fitting is to be attached. This washer member corresponds in contour to the outer contour of the flange portions 68 and is provided with holes 71 around the outer edges thereof in positions corresponding to those of the holes 69 in the flange portions 68.

A round aperture 72 is provided centrally of the washer member 70 of slightly less diameter than that of the aperture in the switch box or other device to which the fitting is to be connected. The edges of the washer member surrounding the aperture 72 are relatively smooth, and this member, therefore, serves to protect the insulation of the wires which are to be passed through the fitting from contact with sharp edges of the hole in the switch box.

The manner of application of the fitting to a switch box or other device is obvious, and consists simply in drilling holes in the box in positions corresponding to those of the holes 69 and 71 in the flange portions 68 and the washer member 70, respectively. The fitting is then secured to the switch box or other device by screws or other suitable means passing through the holes in the flange portions, washer member and the box itself.

The telescope fitting shown in Fig. 6 is utilized for making connections between straight conduit sections or other fittings where it is desired that the length of the connections to be made may be varied through a relatively small range, or where the length of the desired connection does not correspond to any standard length of straight conduit section.

The fitting consists of two relatively short and straight conduit sections 73 and 74, the outside dimensions of the former being slightly less than the inside dimensions of the latter to permit telescoping of the two members. Each of these members is provided with a standard end flange portion 75 at the outer end thereof, whereby connections may be made with conduit sections or other fittings of the system.

The smaller or inner member 73 is preferably constructed from a trough portion 76 and a side plate 77, the edges of which are bent inwardly to form flange portions 78 lying just inside the free edges of the trough portion 76. The structure is suitably completed by spot-welding the edges of the trough portion 76 to the flange portions 78 of the side plate 77. The completed structure, therefore, forms a short conduit section of unbroken rectangular contour in transverse section.

The larger or outer section 74 is similarly constructed from a trough portion 79 and a side plate portion 80 having flange portions 81 at the edges thereof. The flange portions 81, however, preferably overlie the edges of the trough portion 79 on the outside surfaces thereof in order that the rectangular interior contour of the member may be unbroken by the projecting edges of either of the portions.

Protecting ribs 82 are pressed inwardly in the four walls of the member 73 near each end thereof and similar ribs 83 are provided in the four walls of the member 74 near the flanged end thereof, thus providing complete protection for the insulation of the wires to be installed in the fitting.

It will be apparent that when the telescope fitting is installed in a conduit system, the unflanged end of the member 73 may project into the unflanged end of the member 74 such a distance that the fitting will constitute a straight conduit section of any desired length within predetermined limits. The use of this fitting greatly facilitates the installation of conduit systems according to the present invention, and provides for making practically all desired lengths of connections other than those lengths for which standard straight conduit sections are provided.

Fig. 7 shows a closure plate 84, such as the plate 56 partially shown in Fig. 3 and referred to in connection with that figure. The plate 84 is of rectangular form and of the same external dimensions as the flange members of the various conduit sections and fittings. Holes 85 are provided around the periphery of the plate and are located in positions corresponding to those of the holes in the flange members of the other devices. These holes are for the reception of screws or other means for securing the plate 84 to the fittings.

The plate is also preferably provided with a plurality of nearly complete arcuate incisions 86 which are concentrically arranged to permit disc-shaped portions of any desired size to be readily removed from the plate, leaving a round aperture of suitable size for the reception of any desired pipe conduit. The provision of these incisions, forming knock-out portions, further increases the adaptability of a conduit system constructed according to the present invention for combination with pipe conduit systems.

The device shown in Fig. 8 is provided for use when direct connection is to be made between a conduit section or fitting and a switch box, panel or the like, this device being designated as a panel-fitting collar. The device comprises a flange portion 87, the dimensions of which are substantially the same as those of the end flange members used with the conduit sections and fittings. Holes 88 are provided in this flange section and are located in positions corresponding to those of the holes in the said end flange members.

A rectangular aperture 89 is provided in the flange portion 87 and part of the metal from said aperture is struck out to form a lip portion 90 on each of the four sides of the aperture. The general direction in which these lip portions extend is substantially perpendicular to the plane of the flange portion 87, but the lip portions are bent somewhat to present relatively smooth convex surfaces toward the aperture 89.

The lip portions 90 are so spaced relative to each other that the rectangular space occupied thereby is slightly less in area than the openings in the end flanges of the conduit sections and fittings, thus permitting the panel-fitting collar to be inserted in nested relation to any one of said end flanges.

This arrangement is utilized when direct connection is to be made between the end flange of a conduit section or fitting and a panel-box or the like, by first cutting a rectangular hole in the box of sufficient size to permit the insertion of the lip portions of the panel-fitting collar therethrough.

The collar is then placed with the flange portion 87 against the inner wall of the box, with the lip portions 90 projecting outwardly through the opening which has been cut in the box, and holes are drilled in the wall of the box in positions corresponding to the position of the holes 88 in the panel-fitting collar.

The end flange of the conduit section or fitting that is to be connected to the box is then placed against the outer surface of the box wall in nested relation to the projecting lip portions 90, and screws or other suitable means are passed through the holes 88 in the flange portions 87 of the panel-fitting collar, the corresponding holes in the end flange member and the holes which have been drilled in the wall of the box.

This arrangement provides a connection in which the wires entering the box through the fitting are protected from contact with the edges of the hole which has been cut in the box, which contact, if permitted, might result in injury to the insulation of the wires.

Fig. 9 shows a flange member 91 which is generally designated as a trough collar, the purpose of which is to provide for making connection to a conduit section which it is necessary to cut to an odd length. When the necessity for cutting conduit sections in this manner arises, a trough collar of this type is connected to the end of the section that is to be used, at the point where the cut was made.

The collar used for this purpose is identical with the end flange members of the straight conduit sections and fittings, as regards dimensions and location of holes for the reception of the securing means. At least three of the struck out lip portions 92, however, are provided with holes 93 in order that the collar may be secured to the end of the conduit section by passing screws or other suitable means through these holes and through corresponding holes which will be drilled in the walls of the conduit section. It will be seen, therefore, that the use of this device permits the cutting of conduit sections to any desired length whenever it is impossible to use a standard length for a desired installation.

Fig. 10 shows four types of hanger members, including a vertical drop hanger 94, a horizontal drop hanger 95, a horizontal bracket hanger 96 and a vertical bracket hanger 97, all of which are adapted to be used in installing a conduit system according to the present invention.

Each of these hanger members comprises a sheet metal portion 98, the external dimensions of which substantially correspond to those of the end flanges of the conduit sections and fittings, and which includes a rectangular aperture 99 of size similar to that of the duct opening in the conduit sections and fittings. Holes are provided around the periphery of the portion 98 and are located in positions corresponding to those of the holes in said end flanges.

The sheet metal portions 98 are provided with extending portions 100, which may be either integral with the portions 98, as shown for the hangers 95 and 97, or which may be separate pieces secured to the portions 98 by spot-welding or other suitable means, as shown for the hangers 94 and 96. The projecting portions 100 are provided with holes 101 for the reception of screws, bolts, or the like, to secure the hanger members to suitable supports therefor.

The various hanger members are utilized for supporting conduit systems constructed according to the present invention, by placing the portion 98 of the suitable type of hanger between the end flanges of the adjacent conduit sections and fittings throughout the system, before the sections and fittings are secured together. The screws for securing adjacent sections or fittings together then pass through the hanger members as well as the end flanges and serve to clamp the hanger members securely in place.

A hanger member may be used at each junction of conduit sections or fittings, or in as many of these junctions as the service requires. It will be apparent that where a large number of short sections and fittings are used, it will probably not be necessary to provide a hanger member at each junction, but in other cases it may be necessary or desirable to use as many hanger members as the number of junctions will permit.

The essential differences between the different forms of hanger members shown in Fig. 10 lie in the arrangement of the projecting portions 100 with respect to the portions 98.

The hanger member 94 is suitable for use where the wider dimension of the conduit sections or fittings is vertical, and where a vertical supporting member, such as a suspended strap or the like, is used to support the structure by means of a connection to the projecting portion 100. The member 95 is suitable for use with a similar supporting strap or the like, where the narrower dimension of the conduit sections and fittings is vertical.

The projecting portions 100 of the hanger members 96 and 97 are bent at right angles to the portions 98 to provide bracket portions whereby the hanger members may be secured directly to a wall, beam, or the like, by screws or bolts passing through the holes 101. The member 96 is used where the narrower dimension of the conduit sections and fittings is parallel to the surface to which the bracket portion of the hanger is to be secured, and the member 97 is used where the wider dimension of the conduit sections and fittings is parallel to such surface.

The portion of a conduit system shown in Fig. 11 is intended to illustrate the use of the various devices and fittings above described. It will be understood that these devices and fittings are adapted to numerous types of installations other than that here illustrated, but the illustration will serve as an example of one such installation.

An enclosed panelboard 102 or similar device is shown with two straight conduit sections 103 and 104 connected thereto. A 45° vertical elbow fitting 105, such as the fitting 40 of Fig. 2, is also shown in connection with the panelboard box and in connection with a similar elbow fitting 106 for completing a connection between a side of the box and a straight conduit section 107 that is parallel to such side.

A telescope fitting 108 connects the top of the panel-box with a straight conduit section 109. Each of the conduit sections 103 and 104 and fittings 105 and 108 is connected to the panelboard box 102 through an opening in the wall of the box protected by a panel-fitting collar 110, such as that illustrated in Fig. 8 of the drawings.

The straight conduit section 104 extends from the box 102 to a series of fittings including junction box fittings 111, 112, and 113 and straight connecting conduit sections 114 and 115 therebetween. Each of the junction box fittings 111, 112, and 113 is shown with a telescope fitting 116 connected thereto, making respective connection with a series of switch boxes 117 or the like. Panel-fitting collars 118 are used in making the connections between the telescope fittings and the switch boxes, these collars being of the type shown in Fig. 8.

The junction box fitting 111 constitutes a T fitting, since it is arranged to accommodate through conductors and also conductors leading off from one side of the through-line at right angles thereto. The junction box fitting 112 is arranged in the same manner, but has an additional connection made to the fourth side thereof from a straight conduit section 119, thus illustrating the use of the junction box fitting as a cross-fitting adapted to accommodate conductors in two through-lines at right angles to each other and conductors extending from any one of the four branches into another of the branches.

The junction box fitting 113 is used as a right angle elbow fitting, one end thereof being closed by a plate 120 of the type shown in Fig. 7, and one side being closed by a plate 121. The latter plate is shown as having upturned flanges at the ends thereof for the purpose of accommodating securing screws or the like. This type of closure plate is found to be advantageous for certain applications, such as the one shown and referred to. A similar plate 122 is shown as closing one side of the junction box fitting 111.

The conduit line comprising the straight sections 104, 114, and 115 and the junction box fittings 111, 112, and 113 is supported by a series of vertical bracket hangers 123, such as the hanger 97 shown in Fig. 10. The bracket portions of these hangers are secured directly to a wall, beam, or the like, to support the conduit lines.

The conduit section 107 is connected to a panel box 124, or the like, through a box fitting 125, such as that shown in Fig. 5 of the drawings. The conduit section 107 is supported by a horizontal bracket hanger 126, such as that shown at 96 in Fig. 10.

The conduit section 109 has a T fitting 127 connected thereto, this fitting being of the type shown in detail in Fig. 4. This showing of the fitting 127 connected to the conduit section 109 at a point intermediate the ends thereof is illustrative of the manner in which this fitting may be used to connect a branch conduit line to a main line at any desired point.

The conduit section 109 also has a pipe conduit section 128 connected to the side thereof, this connection being effected by removing one of the knock-out portions in the side of the conduit section 109, reference being had to the knock-out portions 37 shown in Fig. 1 of the drawings.

The conduit section 109 is supported by vertical bracket hangers 129 of the type shown at 97 in Fig. 10. This illustrates the application of this type of hanger for supporting a vertical conduit line from a wall, upright beam, or the like.

The upper end of the conduit section 129 is connected through two 45° horizontal elbow fittings 130, of the type shown at 42 in Fig. 2, and an interposed telescope fitting 131, to one end of a horizontal conduit section 132. This use of two 45° elbows and an interposed telescope fitting is very advantageous where it is necessary to avoid an obstruction in the path of a conduit line, such as that illustrated at 133 in the drawings.

A short conduit section 134 extends from the section 132 to connect with a series of 45° horizontal elbow fittings 135 arranged to avoid an obstacle, such as a crossing conduit line 136. The line comprising the straight sections 132 and 134 and elbow fittings 135 is supported by vertical drop hangers 137, of the type shown at 94 in Fig. 10, suspended by straps 138 from overhead beams or the like.

The cross line 136 is shown, by way of example, as being disposed with its wider dimension horizontal, in which event the line may be supported by horizontal drop hangers 139, of the type illustrated at 95 in Fig. 10, suspended from above by straps 140.

From the foregoing description, it will be seen that a conduit system constituting a marked advance in the art has been devised by reason of the great increase in adaptability and accessibility. It has already been pointed out that the devices and fitting are much lighter and easier to handle and to install than are the corresponding devices and fittings of any other conduit system now available.

It will be understood that further commercial development of the invention will, no doubt, involve the addition of further fittings and devices as standard equipment, and also that certain changes and modifications in the details of construction of the particular fittings already disclosed may be made. Therefore, it is not desired that the invention be limited to the specific details of construction herein shown, but only by the prior art and the scope of the appended claims.

The nature and scope of the invention having been thus indicated and a preferred embodiment thereof having been specifically described, what is claimed as new is:

1. An electric wiring conduit system comprising a plurality of duct sections having flanges at the ends thereof for securing adjacent duct sections together, supporting members, and means securing said supporting members to said flanges.

2. An electric wiring conduit system comprising a plurality of duct sections having flanges at the ends thereof for securing adjacent duct sections together, and supporting members adapted to be secured to said duct sections between the end flanges of adjacent sections.

3. An electric wiring conduit system comprising a plurality of duct sections having flanges at the ends thereof for securing adjacent duct sections together, said flanges having registering holes therein for the reception of securing means, and supporting members adapted to be secured to said flanges and having holes therein registering with the holes in said flanges.

4. An electric wiring conduit system comprising a plurality of duct sections having end flanges with registering holes therein, supporting members having holes therein registering with the holes in said flanges, and securing means extending through the holes in the end flanges of adjacent duct sections and in a supporting member.

5. An electric wiring conduit system comprising a plurality of duct sections having end flanges with registering holes therein, supporting members having holes therein registering with the holes in said flanges, and securing means extending through the holes in the end flanges of adjacent duct sections and in a supporting member to secure said sections together and to secure said supporting member between said sections.

6. An electric wiring conduit system comprising a plurality of duct sections having end flanges with registering holes therein, supporting members having plate portions with apertures therein registering with the duct openings in said duct sections and holes therein registering with the holes in said flanges, and securing means extending through the holes in the end flanges of adjacent duct sections and in the plate portion of a supporting member to secure said sections together and to secure the plate portion of said supporting member between said sections.

7. An electric wiring conduit system comprising a plurality of duct sections having flanged ends, and supporting members having apertured plate portions substantially conforming to said flanged ends and adapted to be secured therebetween.

8. An electric wiring conduit system comprising a plurality of duct sections having flanged ends, and supporting members having apertured plate portions substantially conforming to said flanged ends and adapted to be secured therebetween and hanger portions projecting from said plate portions.

9. An electric wiring conduit system comprising a plurality of duct sections having flanged ends, and supporting members having apertured plate portions substantially conforming to said flanged ends and adapted to be secured therebetween and hanger portions integral with and projecting from said plate portions.

10. An electric wiring conduit member comprising a duct portion and end flanges therefor, said flanges having lip portions adapted to extend into said duct portion to be secured thereto, and said duct portion having relatively smooth-surfaced transverse ribs projecting into the duct passage adjacent the inner edges of the lip portions of said end flanges to protect wires or the like within the conduit member from contact with said edges.

11. An electric wiring conduit member comprising a duct portion and end flanges therefor, said flanges having lip portions adapted to extend into said duct portion to be secured thereto, and said duct portion having integral transverse rib portions projecting into the duct passage adjacent the inner edges of the lip portions of said end flanges and presenting relatively smooth surfaces for contact with wires or the like within the conduit member.

12. An electric wiring conduit member comprising a sheet-metal portion forming three walls of a substantially rectangular duct passage, a removable portion forming the fourth wall of such passage, a portion projecting outwardly from each wall of said first-mentioned portion and permanently rigid therewith, and a portion permanently rigid with said removable portion and projecting outwardly therefrom to form, together with said first-mentioned projecting portions, a substantially continuous peripheral flange at either end of the conduit member.

13. An electric wiring conduit system comprising straight sheet-metal duct sections of substantially rectangular transverse section having peripheral flanges at the ends thereof, a junction section comprising two substantially rectangular end flange members each having a substantially rectangular aperture therein from which metal is struck out to form two pairs of lips, the lips of each pair lying in spaced planes substantially at right angles to the main portion of the corresponding end flange member, and two side plates secured at their respective ends to one of the said pairs of lips, the respective edges of said side plates being bent to form flange portions lying in co-planar relation to the lips of the other pairs.

14. An electric wiring conduit system comprising a straight sheet-metal duct section of substantially rectangular transverse section and means for connecting a branch conduit line thereto intermediate the ends thereof, comprising a T fitting having a sheet-metal body portion, a peripheral outwardly projecting flange at one end thereof and flange and tongue portions at the other end thereof for securing the same in abutting relation to a wall of said straight duct section.

15. An electric wiring conduit system including sheet-metal duct sections of substantially rectangular transverse section having peripheral flanges at the ends thereof and a fitting for connecting said duct sections to a switch box or the like, said fitting comprising a body portion having four sheet-metal walls and an end flange member similar to the end flanges of the duct sections and having a rectangular duct opening therein, two of the walls of the body portion being secured to the end flange member along the narrower sides of the duct opening and projecting perpendicularly therefrom, the other two walls of the body portion being secured to the end flange member along the wider sides of the duct opening, and projecting therefrom in divergent planes to form a substantially square duct opening at the other end of the body portion, and the four walls being bent outwardly to form flange portions at the square end of the body portion to facilitate securing the same to a switch box or the like.

16. An electric wiring conduit system including sheet-metal duct sections of substantially rectangular transverse section having peripheral flanges at the ends thereof and a fitting for making variable-length duct connections between said sections, said fitting comprising two rectangular duct sections, each having a peripheral flange at one end thereof similar to the end flanges of the first-mentioned duct sections, one of the duct sections of said fittings being slightly smaller in exterior dimensions than is the other in interior dimensions, whereby the unflanged end of the former may be inserted in telescoped relation to the latter.

17. An electric wiring conduit system including sheet-metal duct sections of substantially rectangular transverse section having peripheral flanges at the ends thereof, and a panel-fitting collar for making connection between the flanged end of one of said duct sections and a panel box or the like, said collar comprising a peripheral flange portion of contour similar to that of the end flanges of the duct sections and having a substantially rectangular duct opening therein surrounded by a plurality of struck-out lip portions presenting relatively smooth convex surfaces toward said duct opening, said lip portions being so spaced relative to each other that the rectangular space occupied thereby is slightly less in area than the openings in the end flanges of the duct sections.

18. An electric wiring conduit system including sheet-metal duct sections of substantially rectangular transverse section having peripheral flanges at the ends thereof, and a trough collar for attachment to the unflanged end of a severed duct section, said collar comprising a peripheral flange portion of contour similar to that of the end flanges of the duct sections and having a substantially rectangular duct opening therein surrounded by a plurality of struck-out lip portions adapted to fit into the unflanged end of a severed duct section and to be secured thereto by screws or the like.

19. The combination with sections of sheet metal wiring trough, of members formed of sheet metal and welded within the adjacent end portions of said sections and extending a short distance therein from the ends thereof, and flanges on said members to extend outwardly beyond the surfaces of said sections between the ends thereof and provided with openings to receive bolts for securing said sections together.

20. An end connection for sections of wiring trough comprising a sheet metal blank formed to provide an angularly extending wall to be secured within the end of a trough section and the remaining portion of said blank being formed to provide an outwardly extending flange for securing adjacent ends of trough sections together.

21. An electric wiring conduit system comprising straight sheet metal duct sections of substantially rectangular transverse section, a plurality of identical frame members having elements conforming to the shape of the duct ends, and interchangeable plate members supplementary to the frame members whereby certain of the frame members constitute crosses, certain others constitute T's and still certain others constitute elbows in the system.

22. In a wiring conduit layout including a plurality of connecting runs of duct in each run of which are disposed a plurality of electric cables, duplicate open end sheet metal duct sections having on their ends cooperating flanges permitting the sections to be joined by means outside of the sections, each of the sections also having on certain of their walls uniformly and closely spaced "knockouts" and also having on at least one wall a movable cover of large area permitting manual access to the interior of the duct section at all points, for pulling of the wires in the conduit layout, and also for permitting wires passed through selected knockout holes to be connected to those in the section, each of the sections also having internal beads to prevent abrasion of the wires therein and also to prevent overcrowding of the wires by limiting the number of wires to be placed therein.

23. In a wiring conduit layout including a plurality of connecting runs of duct in each run of which are disposed a plurality of electric cables, duplicate open end sheet metal duct sections having on their ends cooperating flanges permitting the sections to be joined by means outside of the sections, each of the sections also having on certain of their walls uniformly and closely spaced "knockouts" and also having on at least one wall a movable cover of large area permitting manual access to the interior of the duct section at all points, for pulling of the wires in the conduit layout, and also for permitting wires passed through selected knockout holes to be connected to those in the section, each of the sections having a cross section in the form of an equilateral polygon whereby sections may be joined through their flanges, regardless of the relative positions of the section walls, each of the sections also having internal beads to prevent abrasion of the wires therein and also to prevent overcrowding of the wires by limiting the number of wires to be placed therein.

24. An electrical wiring conduit member comprising a duct portion and end flanges therefor, said flanges having lip portions adapted to extend into said duct portion to be secured thereto, and ribs disposed transversely interiorly of said wiring conduit to protect wires passing therethrough.

25. A conduit system for electrical conductors including a plurality of duplicate open end sheet metal duct sections having on their ends cooperating flanges permitting the sections to be joined by means outside of the sections, each of the sections having on its walls uniformly and closely spaced means for making connection with said conductors and a movable cover extending substantially from end to end and permitting manual access to the interior of the duct section at all points, and supporting plates secured to said duct at junctions between the sections and adapted to be secured to an overhead structure for carrying the duct in spaced relation to said structure.

26. A conduit system for electrical conductors including a plurality of duplicate open end sheet metal duct sections having on their ends cooperating flanges permitting the sections to be joined by means outside of the sections, each of the sections having on its walls uniformly and closely spaced means for making connection with said conductors and a movable cover of large area permitting manual access to the interior of the duct section, and supporting means secured to said duct at junctions between the sections and extending upwardly between the edges of cover on adjacent sections, and adapted to be secured to an overhead structure for carrying the duct in spaced relation to said structure.

27. A conduit system for electrical conductors including a plurality of duplicate open end sheet metal duct sections having on their ends cooperating flanges permitting the sections to be joined by means outside of the sections, each of the sections having on its walls uniformly and closely spaced means for making connection with said conductors and a movable cover of large area permitting manual access to the interior of the duct section, and supporting means attached to certain of said cooperating flanges and adapted to be secured to a supporting structure for carrying the duct in spaced relation to said structure.

PAUL S. JENKINS.